(12) United States Patent
Maylor et al.

(10) Patent No.: US 11,785,000 B2
(45) Date of Patent: Oct. 10, 2023

(54) SECURITY CONTINUITY SYSTEMS AND METHODS

(71) Applicant: Mimecast Services Ltd., London (GB)

(72) Inventors: Jackie Anne Maylor, Wiltshire (GB); Simon Paul Tyler, Wiltshire (GB); Mark O'Hare, Melbourne (AU); Nathaniel S. Borenstein, Greenbush, MI (US)

(73) Assignee: Mimecast Services Ltd., London (GB)

( * ) Notice: Subject to any disclaimer, the term of this patent is extended or adjusted under 35 U.S.C. 154(b) by 275 days.

(21) Appl. No.: 17/076,330

(22) Filed: Oct. 21, 2020

(65) Prior Publication Data

US 2022/0124084 A1 Apr. 21, 2022

(51) Int. Cl.
*H04L 9/40* (2022.01)
(52) U.S. Cl.
CPC ........ *H04L 63/0838* (2013.01); *H04L 63/102* (2013.01)
(58) Field of Classification Search
CPC ........................... H04L 63/0838; H04L 63/102
See application file for complete search history.

(56) References Cited

U.S. PATENT DOCUMENTS

| | | | | |
|---|---|---|---|---|
| 10,440,050 B1 * | 10/2019 | Neel | ............... | H04L 63/145 |
| 10,445,514 B1 * | 10/2019 | Brandwine | ........ | G06F 21/6209 |
| 10,567,375 B1 * | 2/2020 | Mossler | ............... | H04L 63/101 |
| 10,911,489 B1 * | 2/2021 | Chechik | ............... | H04L 51/212 |
| 11,410,165 B1 * | 8/2022 | Cohen | ............... | G06Q 40/00 |
| 2004/0158766 A1 * | 8/2004 | Liccione | ............... | H04L 41/0654 714/4.11 |
| 2009/0293108 A1 * | 11/2009 | Weeden | ............... | G06F 21/41 726/6 |
| 2014/0189829 A1 * | 7/2014 | McLachlan | ........ | G06Q 20/4014 726/6 |
| 2015/0095239 A1 * | 4/2015 | Specogna | ............ | G06Q 20/405 705/72 |
| 2016/0036806 A1 * | 2/2016 | Aguilar-Macias | ........ | H04L 63/0815 726/8 |
| 2016/0189123 A1 * | 6/2016 | Lucia Specogna | ........ | G06Q 20/1085 705/43 |
| 2017/0078922 A1 * | 3/2017 | Raleigh | ............... | H04W 28/10 |

(Continued)

*Primary Examiner* — Jason Chiang
(74) *Attorney, Agent, or Firm* — Nutter McClennen & Fish LLP

(57) ABSTRACT

In various exemplary embodiments, a security continuity system allows users to continue accessing certain user accounts (e.g., email, calendar, contacts, documents, instant messaging, cloud storage, etc.) through alternate logon identity credentials that are automatically provisioned such as when a security event is detected or suspected. The alternate logon identity credentials may be temporary (e.g., just used during security continuity until the original user logon identity credentials can be secured such as by establishing a new password or by having the user select a new logon identity) or permanent (e.g., the alternate logon identity can become the user's new logon identity). Security continuity may be invoked manually (e.g., by the user or by an administrator) or automatically when certain conditions are detected (e.g., through detection of suspicious activities such as repeated user lockouts due to multiple failed logon attempts or upon detection of a successful breach by an attacker).

21 Claims, 3 Drawing Sheets

(56) References Cited

U.S. PATENT DOCUMENTS

| | | | |
|---|---|---|---|
| 2017/0346797 A1* | 11/2017 | Yedidi | H04L 63/14 |
| 2018/0007079 A1* | 1/2018 | Wang | H04L 63/0421 |
| 2018/0046796 A1* | 2/2018 | Wright | G06F 21/45 |
| 2018/0173891 A1* | 6/2018 | Wang | G06F 21/577 |
| 2018/0262503 A1* | 9/2018 | Dawson | H04L 9/3239 |
| 2020/0137096 A1* | 4/2020 | Endler | H04L 63/0846 |
| 2021/0203651 A1* | 7/2021 | Basson | H04L 63/102 |
| 2021/0203661 A1* | 7/2021 | Sankey | G06F 16/245 |

\* cited by examiner

SECURITY CONTINUITY SYSTEMS AND METHODS

FIELD OF THE INVENTION

The invention generally relates to network access continuity services and, more particularly, to continuity services in the context of security events.

BACKGROUND OF THE INVENTION

When a security event is in progress, chaos often reins. To prevent further compromise of sensitive systems, all users are sometimes temporarily blocked from services. Lost employee productivity is often the largest cost of a cyber-attack.

SUMMARY OF VARIOUS EMBODIMENTS

In accordance with one embodiment of the invention, a system, method, and computer program product provide for managing access to user accounts for a security event including receiving a control signal invoking security continuity, securing the user accounts and primary user logon identity credentials, automatically provisioning alternate user logon identity credentials, storing the alternate user logon identity credentials in a credential data store, and providing selective access to user account information through the alternate user logon identity credentials and blocking or restricting access to such user account information through the primary user logon identity credentials.

In various alternative embodiments, the user accounts may be monitored and the control signal may be automatically generated upon detecting a security event involving at least one user account. The control signal may be derived in any of a number of ways including at least one of a user account lockout, a user account compromise, deviation from a baseline, a user panic button mechanism, or an administrator action. The alternate user logon identity credentials may include a logon identity that is obfuscated or modified with an additional piece of information, in which case the additional piece of information may include a one-time password provided to the user by the security continuity system or a user personal identification number. The alternate user logon identity credentials may include a logon identity that is not used outside of the security continuity system. The security continuity system may allow for selective use of both the primary user logon identity credentials and the alternate user logon identity credentials based on user location or other predetermined factors. Providing selective access to user account information through the alternate user logon identity credentials may include selectively allowing access to a predetermined class of information, selectively blocking access to a predetermined class of information, selectively allowing a predetermined class of operations, selectively blocking a predetermined class of operations, sending outgoing emails using an alternate email address associated with the alternate user logon identity credentials, and/or sending outgoing emails using an original user email address, such that the use of the alternate user logon identity credentials is hidden from other email users. The alternate user logon identity credentials may be generated and distributed before the security event and may be activated after security continuity is invoked. The alternate user logon identity credentials may be generated before the security event and may be distributed and activated after security continuity is invoked. The alternate user logon identity credentials may be generated and distributed after security continuity is invoked.

Embodiments additionally or alternatively may disable security continuity and restore user access to the user accounts via new permanent user logon identity credentials provisioned by the security continuity system while security continuity was active, via conversion of the alternate user logon identity credentials to new permanent user logon identity credentials by the security continuity system, or via reactivation of the primary user logon identity credentials by the security continuity system. Embodiments additionally or alternatively may monitor user account activity, implement a first set of security mitigation actions during a "grey" period when likelihood of a security event based on such monitoring is below a predetermined probability or confidence level, and implement a second set of security mitigation actions including generating the control signal invoking security continuity when likelihood of a security event based on such monitoring is at or above the predetermined probability or confidence level. Embodiments additionally or alternatively may automatically direct some or all of a user's incoming emails to a designee when the security continuity system is invoked until at least a user logon using the alternate user logon identity credentials.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Definitions

Figure 1:
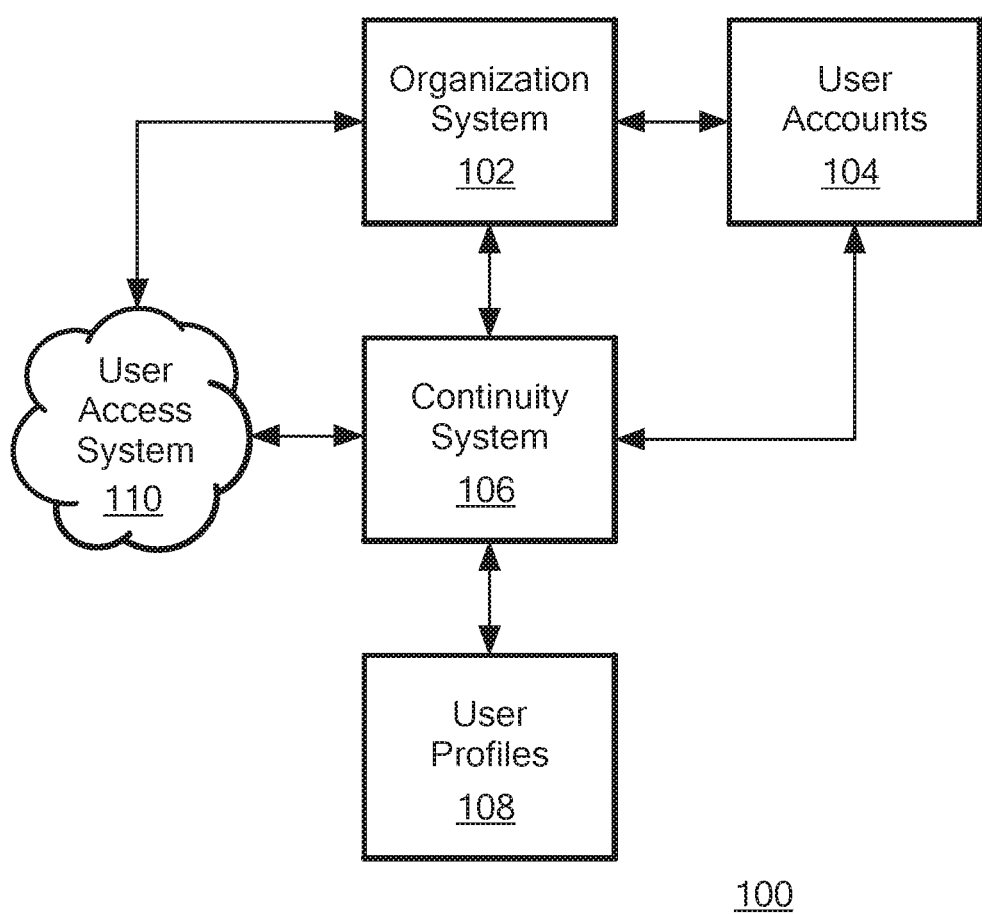
FIG. 1 is a schematic diagram showing elements of an account management system in accordance with various exemplary embodiments.

As used in this description and accompanying claims, the following terms shall have the meanings indicated, unless the context otherwise requires.

The term "provision" or "provisioning" as relating to user logon identity credentials includes generating, storing, distributing, and/or activating user logon identity credentials. These actions can be performed at the same time, e.g., as a single provisioning operation initiated after a security event is detected, or can be performed at different times, e.g., generating and distributing user logon identity credentials in advance of a security event and activating those credentials when a security event is detected. Thus, the term "provision" or "provisioning" can be used to refer to any one or combination of such actions.

The term "security event" may be used herein broadly to refer to any situation in which a security-related action is taken, e.g., upon detection of an actual attack or breach of a system, upon detection of a suspected or potential attack or breach of a system, or even invoking a security-related action for testing or training purposes (e.g., periodically invoking a security continuity system of the type described herein to test operational readiness).

Introduction to Security Continuity

In various exemplary embodiments, a security continuity system allows users to continue accessing certain user accounts (e.g., email, calendar, contacts, documents, instant messaging, cloud storage, etc.) through alternate logon identity credentials that are automatically provisioned such as when a security event is detected or suspected. The alternate logon identity credentials may be temporary (e.g., just used during security continuity until the original user logon identity credentials can be secured such as by establishing a new password or by having the user select a new logon identity) or permanent (e.g., the alternate logon identity can become the user's new logon identity). Security continuity may be invoked manually (e.g., by the user or by an administrator) or automatically when certain conditions are detected (e.g., through detection of suspicious activities such as repeated user lockouts due to multiple failed logon attempts or upon detection of a successful breach by an attacker). When security continuity is invoked, alternate logon identity credentials are provisioned for one or more affected users, and each affected user can logon via the user's alternate logon identity credentials to access the user accounts. Preferably, the alternate logon identity credentials are obfuscated to make them difficult for an attacker to guess so that, for example, it would be difficult for the attacker to compromise the user's account again. Such a security continuity system can be particularly useful for situations in which a user's email address is used as the user's logon identity (since email addresses often can be easy to obtain or guess), although embodiments can be applied more generally to other types of logon identity credentials including those in which users select their own logon identities (since many people tend to choose identities that are easy to remember and hence easy to guess). The use of email addresses as logon identities can be particularly problematic for organizations because once an attacker understands how an organization assigns email addresses (e.g., by communicating with members of the organization or by finding examples of user email addresses through publicly available information such as through an organization or social media site), it is not particularly difficult for the attacker to guess email addresses of other past and present users to use in attacking the organization or particular users. Attacks can range from simple (e.g., trying to guess a user's password or locking a user out of the system by making repeated logon attempts until the user's logon is suspended) to sophisticated (e.g., an attacker actually gaining access to the user's account such as via a guessed or stolen password).

FIG. 1 is a schematic diagram showing elements of an account management system 100 in accordance with various exemplary embodiments. Among other things, the account management system 100 includes an organization system 102 that maintains and manages access to various types of user accounts 104 (e.g., email, calendar, contacts, documents, etc.) for an organization and a continuity system 106 that manages access to the user accounts 104 during continuity events. The continuity system 106 may be separate from the organization system 102 (e.g., provided and/or managed by a third party) or may be part of the organization system 102 (e.g., provided and/or managed by the organization). It should be noted that the Applicant, Mimecast Services Ltd., is a provider of certain continuity systems (among a wide range of products) and therefore exemplary embodiments of security continuity may be described herein in the context of Mimecast continuity systems, although it will be apparent from the description that security continuity can be implemented more generally in other types of systems.

With reference again to FIG. 1, users generally access the organization system 102 directly via access system 110 (e.g., via the Internet), although indirect access may be provided through the continuity system 106 such as during continuity events. Generally speaking, user logon identity credentials for direct access to the user accounts 104 via the organization system 102 and for indirect access to the user accounts 104 via the continuity system 106 will be the same (e.g., via the same username and perhaps even the same password), although in some cases different user logon identity credentials will be used for the different systems.

Infrastructure Continuity Vs. Security Continuity

Infrastructure continuity systems generally are designed to address planned or unplanned outages, e.g., in Exchange or Office365 infrastructure or the network. Infrastructure continuity systems generally focus on monitoring mail flow and continued access to mail services in such an outage. The access portion can be achieved through the use of custom clients\plugins and a "cloud password" provisioned by the continuity system. Such events are typically wide ranging across an organization and, while inconvenient, they generally do not pose specific risks to the organization beyond the incident itself. Also, such infrastructure events are often planned and any configuration (such as provisioning cloud passwords) can be performed in advance on an ad hoc basis or even during an event.

Generally speaking, a security event is quite different from an infrastructure event and as such security continuity systems of the types described herein generally will have different characteristics. For example, a security event:
1. Is rarely (if ever) planned
2. Can affect anyone from just a single person to the whole organization
3. May be targeted at certain types of user or organization
4. Can move between users
5. Can move between customers (possibly related customers)
6. Can move to external third parties (possibly related third parties)
7. Can affect much more than just mail flow and mail access
8. Requires active containment
9. Can have longer lasting effects once the event is contained
10. Generally requires post-event remediation actions Thus, security events generally will require more pre-planning, as the timing of an event is unknown. While there are continuity systems that provide increased protection before an attack and provide ways to recover following an attack, continuity systems generally provide little in the way of protection during an attack other than by continuing to process requests in the same way or by using the cloud password mechanism. Also, while some organizations feel that they may no longer need a continuity system, especially when using a cloud-based service such as MICROSOFT™ OFFICE 365™, security events can happen in cloud environments just as easily as in on-premise environments, especially when malicious insiders are considered. Taking all of this into consideration, the inventors contemplate that either an existing continuity product could be enhanced to provide security continuity more suited for these use-cases or an entirely new security continuity system could be built.

Security Continuity Discussion

As mentioned above, in exemplary embodiments, the security continuity system provisions alternate logon identity credentials for one or more users when security continuity is invoked. Alternate logon identity credentials can be established and distributed in advance or can be established and distributed after security continuity is invoked, but, generally speaking, such alternate logon identity credentials only would be activated after security continuity is invoked. Alternate logon identity credentials are preferably obfuscated to some degree in order to make it harder for an attacker to guess. Alternate logon identity credentials can be distributed in any manner deemed to be sufficiently secure, such as, for example, through an alternate email address associated with the user, through a messaging service (e.g., SMS, SLACK™, etc.), through a distribution mechanism using two-factor authentication (2FA), or through some other mechanism. Similarly, notifying a user that security continuity has been invoked (e.g., if done separately from distribution of alternate logon identity credentials) can be accomplished in any manner deemed to be acceptable, such as, for example, through an alternate email address associated with the user, through a text message to the user, through a message provided on a logon screen, or through some other mechanism. Generally speaking, during the time that security continuity is active, the user's primary logon identity credentials would be blocked (although some embodiments may allow for continued use of the primary logon identity credentials, generally in a restricted manner such as based on the user's device, location, and/or other factors), but once logged on under the alternate identity, the system could function as if the primary identity had been used (i.e., without restrictions) or alternatively restrictions could be imposed for the alternate identity, e.g., access to old emails or the archive could be restricted or read-only, and/or additional security and data leak prevention checks could be performed on messages. In any case, generally speaking, the user's primary email address will still operate substantially as usual, e.g., incoming emails to the address will be able to reach the user's account and outgoing emails sent by the user will utilize the primary email address (although the system could be configured to send outgoing emails using the alternate email addressed used to logon), even if the user's original logon identity credentials utilize the user's email address. In this way, there would be minimal interruption to the user's email and other accounts even when the user is required to use temporary alternate logon identity credentials to access those accounts, and the outside world would not be able to detect the authentication change.

Figure 2:
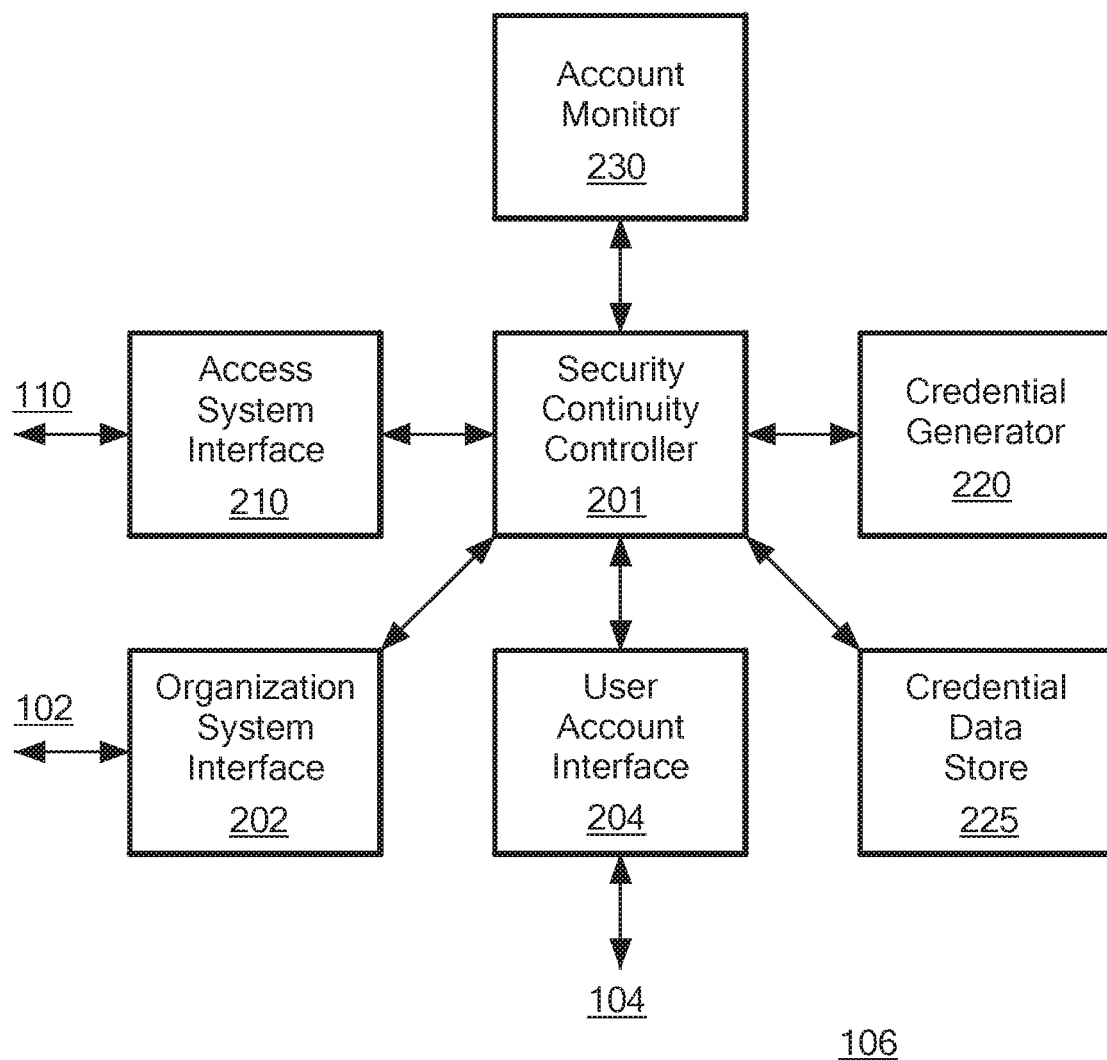
FIG. 2 is a schematic diagram showing elements of a continuity system configured to implement security continuity, in accordance with certain exemplary embodiments.

For purposes of the following discussion, reference will be made to FIG. 2, which is a schematic diagram showing elements of a continuity system 106 configured to implement security continuity, in accordance with certain exemplary embodiments. Among other things, this security continuity system 106 includes a security continuity controller 201 as well as an organization system interface 202 for interfacing with the organization system 102, a user account interface 204 for interfacing with the user accounts 104, and an access system interface 210 for interfacing with the access system 110. The security continuity controller 201 typically includes a processor coupled to a non-transitory memory containing instructions executable by the processor to perform security continuity processes as discussed herein.

This security continuity system 106 also includes a credential generator 220 that generates user logon identity credentials as discussed further below, a credential data store 25 in which user logon identity credentials are stored, and optionally also an account monitor 230, which, as discussed further below, can be configured to monitor for suspicious user account activities. It should be noted that the account monitor 230 could be external to the security continuity system 106, e.g., as a separate product that can provide security intelligence to various entities such as the administrator, the user, the security continuity system 106, and other entities.

Figure 3:
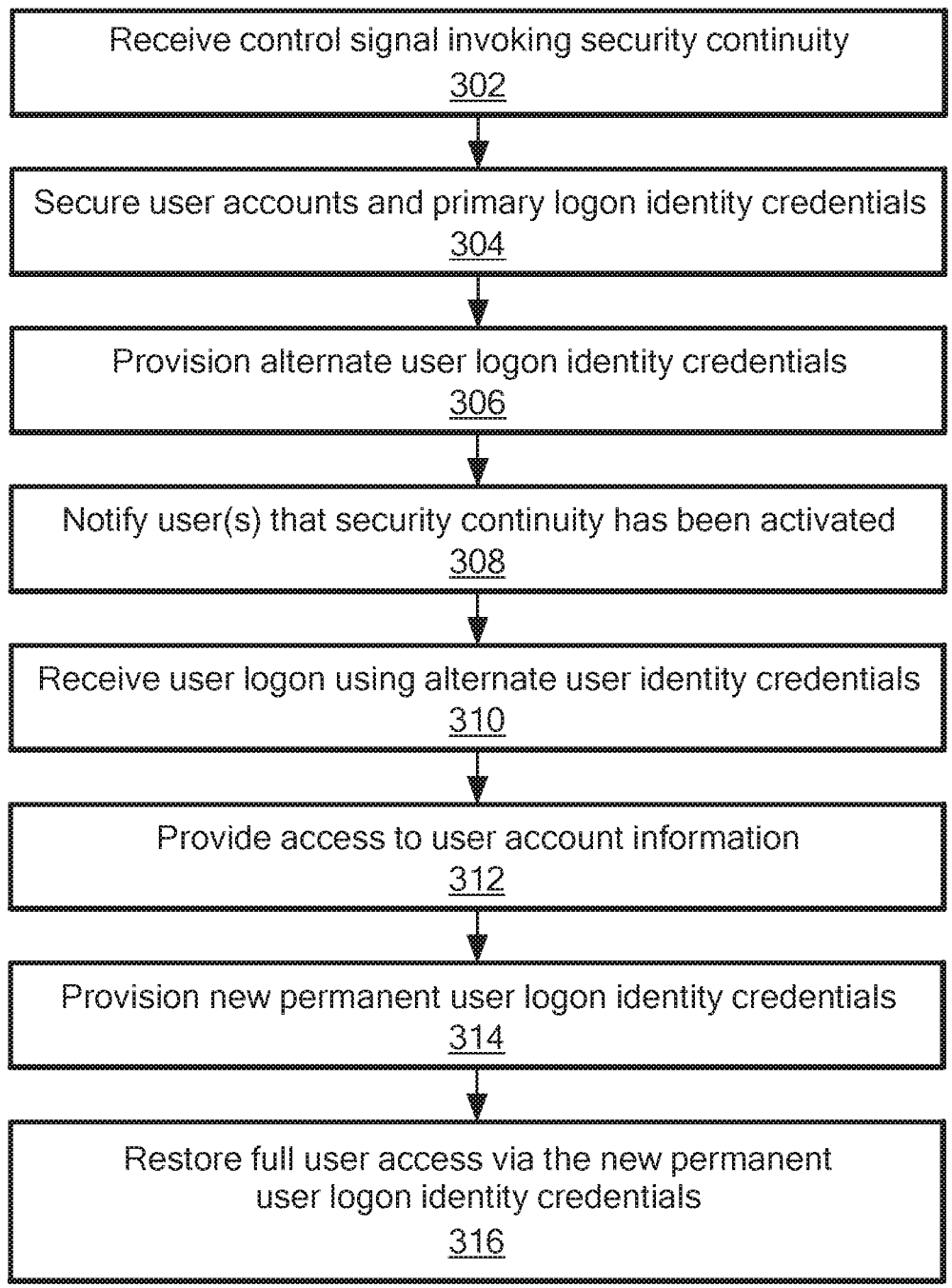
FIG. 3 is a high-level logic flow diagram for the security continuity controller 201, in accordance with certain exemplary embodiments.

FIG. 3 is a high-level logic flow diagram for the security continuity controller 201, in accordance with certain exemplary embodiments. In block 302, the security continuity controller 201 receives a control signal invoking security continuity, for example, from an administrator (e.g., via the organization system interface 202), from a user (e.g., via the access system interface 210 or user account interface 204), or from the account monitor 230. In block 304, the security continuity controller 201 secures user accounts and primary logon identity credentials, e.g., by terminating existing user sessions to force new logons and by blocking or quarantining use of the primary logon identity credentials. In block 306, the security continuity controller 201 provisions alternate user logon identity credentials, which could include generating (via the credential generator 220) and distributing alternate user logon identity credentials if not done in advance and in any case activating the alternate user logon identity credentials in preparation for new user logons. In block 308, the security continuity controller 201 notifies user(s) that security continuity has been activated, which could be accomplished as part of the distribution of alternate user logon identity credentials or, particularly if alternate user logon identity credentials were distributed in advance, could be accomplished using a separate message or notification provided to the user(s), e.g., via email, text, logon screen message, etc. In block 310, the security continuity controller 201 receives a user logon using the alternate user identity credentials. In block 312, after satisfactorily authenticating the user, the security continuity controller 201 provides access to user account information, e.g., by linking the alternate user logon identity credentials to user accounts such as email, calendar, contacts, documents, etc. The security continuity controller 201 may provide restricted access to user account information during security continuity, e.g., by limiting what information can be accessed and what operations can be performed on the information by the user or otherwise. For example, the security continuity controller 210 may selectively allow or block the user's ability to view, edit, add, create, update, delete, send, or receive certain information (e.g., incoming emails, prior emails, documents, messages, etc.). The types of restrictions could be pre-programmed or configurable, e.g., by an administrator. In block 314, the security continuity controller 201 provisions new permanent user logon identity credentials, which may include the user's old logon identity (e.g., email address or other identity, typically with a new password) or may include a completely new logon identity, and which may be established, for example, by the security continuity controller 201, by the organization system 102, or by the user (e.g., selecting a new username and/or password). In block 316, the security continuity controller 201 restores full user access via the new permanent user logon identity credentials. Some of these aspects are now discussed in greater detail.

Invoke Security Continuity

In various exemplary embodiments, security continuity could be invoked, for example, by administrator action, by user action, and/or automatically (e.g., through a system that monitors user accounts for such things as password attacks or actual credential loss).

A password attack is generally when one or more user accounts are repeatedly being locked out, which could affect a small number of individual users or much larger groups and also could include non-existing users/users that have since left an organization, as the attacker may not know the full user names or who is still current. While it is common for user lockouts to happen from time to time (e.g., on a "password change" day), it generally would be unusual for large numbers of users, high profile users, or users who have left the organization to be locked out. It is also possible that an individual user may accidently enter their credentials into a malicious site or have an attacker guess the user's password or obtain the user's password in other ways. In this case, a user may end up being locked out because the attacker has since changed the user's password.

Actual credential loss is generally when an attacker gains actual access to the user's account, which can be detected in a number of ways, such as, for example, analysis of the user's normal patterns of typing (e.g., phrases used, how they sign off an email, frequency of email sending, etc.) and seeing if these have changed, archive search use analysis, geolocation analysis, and other methods.

An administrator may want to invoke security continuity for any of a number of reasons. For example, the administrator may want to invoke security continuity upon learning of an actual or potential password attack against a user, an actual or potential credential loss of a user, or upon detecting other security concerns. An administrator may receive input from a monitoring system that monitors for suspicious activities such as user account lockouts and unusual logon and usage activities, such as, for example, multiple user logon attempts, attempts to log onto old accounts, attempts to log onto high profile accounts, attempts to logon using similar account names, a flood of email from accounts that don't usually send so much email, geolocation-based logon analysis, machine learned analysis of user normal logon actions and normal patterns of typing (e.g., phrases used, how they sign off an email, etc.), etc. An administrator also may want to invoke security continuity to perform periodic tests of the system.

A user may want to invoke security continuity for any of a number of reasons. For example, without limitation, the user may want to invoke security continuity upon being denied access to the system (e.g., a logon failure), upon taking an action that they soon question or regret (e.g., entering their logon credentials into a suspicious site or clicking on a link in a suspicious email), upon detecting suspicious account activity (e.g., noticing a sent email that they did not send), upon detecting suspicious computer activity (e.g., a suspicious email or popup message), or for any other reason. The user may be provided any of a variety of ways to invoke security continuity or other security measures. For example, without limitation, the user may send an email (e.g., from another machine) or text message to an administrator who then will invoke security continuity. The inventors also propose a new mechanism, referred to herein as a "panic button," that the user can "press" to invoke protective measures that can include security continuity and/or other protective measures (e.g., starting an immediate lockdown process, disconnecting the user from online systems, alerting IT department, starting a scan of files, evaluating recent contacts and user activities, etc.). For example, without limitation, such a "panic button" could be added to a computer system in the form of a physical key on a computer keyboard, as a keyboard shortcut or soft key, as a menu selection in an application menu or toolbar, as a button, as a voice command, or in any other way that a user could signal the system to invoke security continuity or other security measures.

Also as mentioned above, security continuity additionally or alternatively could be invoked automatically such as through the account monitor 230 that can be configured to detect any of a variety of security threats or compromises such as any of the security threats or compromises of the types described herein. In this respect, the account monitor 230 can be configured to take inputs from various other systems, e.g., to detect security threats, compromises, deviations from baseline from activity monitoring, etc., with the understanding that it is possible that no single product would have sufficient information to reliably invoke a security incident response but that information from a combination of products would provide sufficient information. For example, without limitation, the account monitor 230 could take inputs from identity management systems, DNS security systems, web security systems, or other systems. It should be noted that the account monitor 230 could be part of the security continuity system 106 or could be separate from the security continuity system 106.

Secure User Accounts/Primary User Logon Identity Credentials

When security continuity is invoked, the security continuity controller 201 can take any of a number of actions on an individual user or bulk basis, e.g., as part of the operations of block 304 of FIG. 3. Without limitation, the following are some of the actions that can be taken by the security continuity controller 201 when security continuity is invoked:

1. Password resets in both email systems and any other systems that use the compromised ID or password
2. Alert the administrator, who then could invoke whatever procedures the organization wants to follow
3. Revoke application bindings to force new logons
4. Log out of all web clients within Mimecast and Exchange/O365
5. Provide new temporary/permanent identities
6. Remove archive (email, calendar, contact) access under the compromised identity
7. Require authentication to send email (SMTP AUTH) under temporary identity
8. Remove contact and calendar access in the old identity
9. Delete or hide all Exchange data on old account
10. Block the old account entirely without allowing new access
11. No delivery to Exchange until after the security event has ended Provision Alternate Logon Identity Credentials As mentioned above, alternate user logon identity credentials can be provisioned in preparation for or upon detection of a security event. It is proposed by the inventors that such alternate user logon identity credentials would have some or all of the following characteristics:

1. Not easily guessable
2. Could be used for authentication only, e.g., no email is routed through the alternate identity or a new email identity also could be provisioned
3. Could be hidden from the organization system, e.g., known only by the security service (e.g., Mimecast Email Security services) in order to improve security 4. Could be linked to the compromised identity so that the user can continue accessing such things as active and archive emails, calendars, contacts, and documents For example, during normal system operation, a user's email address and logon identity might be something like:

Email address: person@organization.com
Logon identity: person@organization.com

Without limitation, the following are some exemplary alternate logon identity concepts for purposes of security continuity:

Email address: person@organization.com
Alternate logon identity: person@organization.alt or
S34!de28@organization.com or
S34!de28@de2enspp.mc or
person+XXXX@organization.com.

The first example of an alternate logon identity is very simple but generally would provide little security because it would be relatively easy for an attacker to guess or learn, especially if the change from ".com" to ".alt" was the standard used across the organization.

The second example of an alternate logon identity obfuscates the local part of the email address but continues using the original domain.

The third example of an alternate logon identity obfuscates both the local part and the domain of the email address.

The fourth example of an alternate logon identity is a combination of the primary logon credential with an additional piece of information that can be provisioned in advance or at the time security continuity is invoked and in some cases could be user-selected to make it easier to remember. For example, without limitation, the "XXXX" could be a one-time password (OTP) (e.g., provided through an OTP app or via text or email), a pre-selected personal identification number (PIN), etc. In this example, the additional piece of information is preceded by a "+," but it should be noted that the additional piece of information can be combined with the original logon identity in any manner, with or without a connector such as "+." The inventors envision this type of alternate logon identity to be easy for the person to implement because only the additional piece of information should need to be obtained or remembered. Furthermore, in some cases, the alternate logon credential with additional piece of information could be used as a incoming email address, e.g., if someone were to learn of the alternate logon credential and send an email to it, the system could deliver it to the account.

In the latter three cases, the alternate logon identity should be significantly more difficult for an attacker to guess or learn, thereby making it harder for an attacker to initiate or continue an attack on the user or system. The third example takes advantage of the fact that, in certain exemplary embodiments, the alternate login identity would not be used publicly such as for sending and receiving emails and therefore the domain part can be obfuscated.

It should be noted that alternate logon identities could utilize other forms that in some cases could be in a completely different form than the original logon identity (e.g., the original logon identity could be in the form of an email address but the alternate logon identity could simply be a randomized character string).

In any case, it is contemplated that email messages to person@organization.com would still flow as normal, e.g., incoming emails sent to person@organization.com still would be received by the user account and outgoing emails sent from the account still would use the original email address of person@organization.com. In exemplary embodiments, attempts to logon as person@organization.com generally would be blocked although some embodiments can allow logons using the original identity in certain situations (e.g., allowing logons from a trusted network such as an office VPN but blocking logons from outside of the trusted network) or for certain purposes (e.g., to allow an attacker to access a "dummy" account while investigation of the attack is ongoing).

It should be noted that alternate user logon identity credentials can be provided for logon identities other than email addresses. For example, for purposes of security continuity, the following are some exemplary alternate logon identity concepts when the user's primary logon identity is not the user's email address:

Email address: person@organization.com
Primary logon identity: person's name or initials
Alternate logon identity: S34!de28 or
name+XXXX or
initials+XXXX.

In the latter two examples, similar to the example above, the alternate logon identity is a combination of the primary logon credential with an additional piece of information that can be provisioned in advance or at the time security continuity is invoked and in some cases could be user-selected to make it easier to remember. For example, without limitation, the "XXXX" could be a one-time password (OTP) (e.g., provided through an OTP app or via text or email), a pre-selected personal identification number (PIN), etc. In this example, the additional piece of information is preceded by a "+," but it should be noted that the additional piece of information can be combined with the original logon identity in any manner, with or without a connector such as "+." The inventors envision this type of alternate logon identity to be easy for the person to implement because only the additional piece of information should need to be obtained or remembered.

It should be noted that in some cases, it may not be necessary to provision an alternate identity for every user. For example, because alternate identities can be changed at any time, it may be possible to pre-provision a small number of alternative identities and then allocate them to users only when necessary.

It also should be noted that in some cases, it may not be necessary to change the password associated with a particular user. For example, in account lockout situations, it is likely that the user's password has not been breached and remains secure. The alternate identity provided to the user is a non-public identity, so it is unlikely to be subject to lockout attacks, which is a main purpose of provisioning such an identity. Thus, in some cases, it may be safe to allow the user to logon using the alternate identity but the original password, which would greatly simplify the user switching to the new identity. However, in some cases, the password may no longer be trustworthy and both a new identity and a new password would be provisioned (in which case 2FA may be used to help authenticate the person).

It also should be noted that the alternate user logon identity credentials can be associated with different privileges (e.g., permissions) than the primary user logon identity credentials on a temporary or permanent basis. For example, the alternate credentials may be associated with higher privileges than the primary credentials (e.g., administrative privileges compared to normal user level privileges for the primary credentials) or may be associated with lower privileges than the primary credentials (e.g., normal user level privileges compared to administrative privileges for the primary credentials) for at least some amount of time after the user logs on using the alternate credentials. The former approach could facilitate management of user accounts for users that have separate accounts with separate privileges, e.g., one user account with normal user level privileges and another account with administrative privileges, which would require administration of the two accounts (e.g., by IT) as well as being a potential burden on the user (e.g., having to remember two different passwords), and could be used independently of security continuity. The latter approach could provide an additional level of protection, e.g., allowing a user who generally has administrative privileges to logon using the alternate credentials but not have access to the administrative privileges at least temporarily.

Distribute Alternate Logon Identity Credentials

As mentioned above, alternate logon identity credentials can be distributed in any manner deemed to be sufficiently secure, such as, for example, through an alternate email address associated with the user, through a messaging service (e.g., SMS, SLACK™ etc.), through a distribution mechanism using two-factor authentication (2FA), or through some other mechanism. Alternate logon identity credentials can be distributed in advance (e.g., so that the alternate logon identity credentials already can be in their password manager) or after security continuity is invoked. The user may be required to prove their identity, e.g., confirming receipt of a code by text message after which the user would be given a new identity and password, or providing a link to the user through which the user can prove his or her identity before being given a new password (e.g., (text: "Your account has been locked for security purposes. We have given you a new temporary login XXX@YYY. Go to this web page: http://blah.blah and answer the security questions and you will receive your new temporary password" or "Your account has been locked for security purposes. Go to this web page: http://blah.blah and answer the security questions and you will receive an OTP to use as part of your alternate logon identity"). The system may be configured to select an appropriate distribution mechanism based on the type or trigger of a security event, e.g., the system might disable SMS messaging and instead use an alternate email address if the security event was triggered by loss or theft of a user's phone, or the system might utilize SMS messaging instead of an alternate email address if the security event was triggered by breach of the user's email systems. The system could suggest human interaction as the best mechanism for distributing alternate logon identity credentials if, say, a breach is so severe that no other mechanism is deemed to be sufficiently safe.

Actions after Security Continuity

Once the security continuity event has passed, if appropriate, the security continuity controller 201 may permit the user to use their old logon identity (e.g., email address or other identity), typically with a new password. Alternatively, in some cases, the user may be required to choose a new "permanent" identity or may be assigned a new "permanent" identity (e.g., by an administrator), where "permanent" here is relative in the sense that this new identity would be used outside of security continuity for some extended period of time but, of course, could be changed from time to time such as upon a subsequent invocation of security continuity. In any case, in exemplary embodiments, all activities taken by the user during the security continuity event generally would be reflected in their user accounts, e.g., emails sent during security continuity should be shown in their email account (e.g., OUTLOOK™ folder structure) and a full archive should be shown.

Discussion of Specific Types of Security Events

The following is a list and discussion of some specific types of security events that are or may be relevant to a security continuity system of the type described herein and outlines how they are relevant, how they can be detected, and how they can be mitigated. Each security event type is discussed here individually for clarity, although in real-world situations, these types of incidents can and often do blur together. The security continuity system 106 can offer ways to detect and mitigate these and other types of security concerns, and, in this regard, the account monitor 230 may be configured to monitor for any of these types of security events and to automatically invoke security continuity in appropriate circumstances.

Password Attacks and Account Lockout

As mentioned above, password attacks are generally brute force attempts to guess passwords or to purposely lockout a user. Such attacks commonly lead to account lockouts due to failed password attempts, which could involve a small number of individual users or much larger groups. While many products (e.g., Exchange\Office365 and Mimecast) are robust to the attack itself and it is highly unlikely that a password would be guessed, the side effect of the attack, which is account lockout, is an effective denial of service (DOS) tool. Also, the move towards more centralised account and password management, e.g., using privileged access management products, can mitigate this in many ways by making any actual password breach less of an issue, but they still leave customers vulnerable to the DOS side effect. Of course, user lockouts do happen from time to time (e.g., on "password change" days, or on systems that the user does not use frequently). Not only is it still possible to achieve account lockout by repeatedly entering incorrect 2FA tokens, but also due to the nature of such services, it is also possible for the lockout to move beyond the immediate service being attacked to other services associated with the account. This is possible without the attacker even having knowledge of what those systems are, since, in essence, the 2FA provider is the one actually being attacked in this case.

Without limitation, the following are some possible detection methods:
1. Unusually high number of account lockouts
2. Unusual geo-location lockouts
3. Unusual time lockouts
4. Unusual device lockouts
5. Affects many users on same domain at once
6. May see attempted logins for unused, historic, unlikely, or non-existent users
7. Other user activity (e.g. email, IM, SWG, etc.)
8. Increasing number of attacks on related infrastructure or systems Without limitation, the following are some possible mitigation methods:
1. IP rate limiting
2. IP blocking
3. 2FA
4. Account lockout
5. Security continuity The first four of these can work to some extent but will be unlikely to address the account DOS side effect, and such solutions are generally less available and generally will be ineffective because the user's logon identity is usually a public identity based on their email address. Security continuity addresses the DOS side effect by changing the user's logon identity to an alternate identity that is not public and hence not subject to easy DOS lockout. The alternate identity is also not fixed and can be changed or revoked at any point so that if it is compromised then the whole identity can be reset.

Restrictive Two Factor Authentication

Most identity providers allow two factor authentication to be performed via a number of mechanisms, such as, for example:
1. Email
2. SMS
3. Installed application And it is often possible to restrict this. However, even when restricted to only installed applications, identity providers typically allow for authentication codes to be directly entered into an application (e.g., browser), which allows an attacker to enter any authentication code. This can be used as a proxy for lockout using a guessed password. The attack is unlikely to be successful but can lead to a DOS against the account. A more restrictive app-based authentication could easily avoid the entering of authentication codes and instead require approval on the 2FA device. In any case, security continuity can be invoked if a user lockout occurs due to repeated 2FA failures.

Compromised Account/Credential Loss

Actual credential loss can be a side effect of a password or phishing attack. Without limitation, the effects of such an attack are hard to quantify but could include some of the following:
1. Loss of access to the account (such as if the password is changed)
2. Data loss
3. Reputational damage (should the account be used maliciously)

Without limitation, the following are some possible methods of detecting actual credential loss:
1. Excessive mailing (outbound and internal)
2. Mailing to unusual groups of people (i.e. something is randomly selecting from
contacts list)
3. Outbound/internal malware/phishing/spam detected directly of via remediation
4. Unusual archive usage—i.e. searching, sending outbound from archive (a user account could have key words, document triggers unique to that customers business that would be unusual to send/look at in patterns)
5. Unusual DLP triggering
6. Logon from unexpected IP range, time of day, device
7. Multiple simultaneous logons
8. User has clicked on a phishing link, which could be detected by a threat protection mechanism or could be self-reported by the user, e.g., using a "panic" button of the type described herein or through another mechanism offering immediate protection (no waiting for an IT response)
9. Unexpected or unusual password reset e.g. password reset from an unusual GeoIP or an unusual time of day
10. Web monitoring (e.g., breached credentials dumps) including monitoring or searching the dark web Many of these detection methods can be summarized as monitoring against a baseline established for the user across a number of services. This baseline generally would be learned over time, e.g., by monitoring a user's activities, devices, and other indicators of identity in real-time. Without limitation, some examples of such indicators include email activity, archive searching activity, Slack messages, the type of device typically used (e.g., Chrome vs. Mac), apps, browser, style of usage (e.g. unusual archive searches), location, time activities are conducted, device characteristics (e.g., watch, phone, home hubs, office WiFi, proximity to device sending, the user usually has a phone nearby with a Bluetooth connection, etc.), IP address, country, expected time of reading and sending messages, etc. Thus, for example, the system may maintain an activity baseline and a device baseline. Significant deviation from the baseline(s) generally would be considered indicative of account compromise or malicious intent.

Many of the detection methods are not accurate indicators of compromise by themselves, so a "grey" period can exist when a compromise is suspected but not confirmed. Without limitation, the following are some possible mitigation methods that can be taken once a compromise is confirmed:
1. Lock/disable account pending investigation. This can include preservation of any evidence required such as performing an automatic legal hold or disabling account purging
2. Lock account and invoke password change following detection—auto or Admin/manual
3. Lock account until password change been actioned by user
4. Revoke access to Archive (email, contacts, calendar)
5. Use of alternative identity as above
6. Revoke all access to existing applications (revoke application bindings, forced web application lockout)
7. Disable all access via any Mimecast or $3^{rd}$ party SSO solution Without limitation, the following are some possible mitigation methods that can be taken during the grey period before a compromise is confirmed:
1. Grey period data shown to Admin on an Incident Dashboard—i.e. who was emailed, archived searches
2. Incident Dashboard shows details of potential accounts 'affected'/corresponded with
3. Incident Dashboard shows details of the attempted outbound/internal malware/phishing/spam and where sent to/arrived from
4. Incident Dashboard shows details attempted logins especially where excessive or unusually activity is seen
5. Internal accounts potentially affected during the grey period to also have option to change password and this action shown on the Incident Dashboard as per initial compromised account
6. Customer Admin informed of exact moment of breach/source of breach if known
7. User notified of potential breach via Security Incident Reporting below
8. Internal and External Supply chain notified of breach time and to be aware of the unexpected from this user
9. Restrict access to existing Exchange data to mitigate any loss
10. Restrict access to any $3^{rd}$ party product accessed by this identity via SSO
11. Stricter email sending policies—such as SMTP AUTH being required or additional outbound DLP checks
12. Restrict delivery to the customer's mail server (and elsewhere) to mitigate any further damage Thus, for example, the system can implement multiple levels of security mitigation based on probability or confidence level, e.g., implementing a first set of security mitigation actions during the "grey" period when a compromise is suspected but not confirmed (e.g., when compromise is below a predetermined probability or confidence level) and implementing a second set of security mitigation actions (which could include invoking security continuity using alternate user logon identity credentials) when compromise is confirmed or above a predetermined probability or confidence level.

Additional mitigation methods are described below for different detection types.

Outbound/Internal Malware

Outbound and internal malware are relevant in the context of security continuity. Generally speaking, inbound malware is on the internet and outside the control of the organization or security system provider, as anyone can attempt to send malware into the system intentionally or even inadvertently. Rejection on receipt is one way to address inbound malware.

Outbound malware is different, as it resides in the organization system or security system and therefore the organization or security system provider is probably unaware that malware may be propagating internally or may have been sent out externally. Among other things, this can cause potential reputation damage for the organization and for the security system provider.

Malware detection and remediation products exist, but they generally provide little in the way of mitigation beyond deletion of offending files from the users inbox and blocking or quarantining any malware files (although the inventors contemplate a mitigation approach in which malware files are allowed to be accepted into the system rather than being rejected so that workflows can be followed, especially around remediation).

Without limitation, the following are some possible mitigation methods that can be taken once malware has been detected internally:
 1. Invoke Compromised Account\Credential Loss mitigations (e.g., security continuity)
 2. Invoke Ransomware & Encrypted files mitigations
 3. Invoke enhanced threat/email scanning, e.g., all bypasses disabled, deeper inspections (e.g. dual sandbox)

In the context of security continuity, outbound and internal malware generally would be considered a positive indication of account compromise that can mitigated using the types of compromised account mitigations discussed above. Outbound malware also can be an indicator of a server compromise, in which case the entire server generally would be considered unsafe (and, for mail, generally would be considered an infrastructure outage). Outbound malware that was previously undetected (and hence delivered externally) but is retrospectively detected generally warrants special consideration, e.g., as it may be desirable to inform a third-party recipient of the incident.

Outbound Spam

Outbound spam outbreaks are a common side effect of malware or credential loss and can be handled in the same way. Outbound spam is notoriously difficult to detect. While many of the techniques used in inbound spam are still valid, they generally are not as effective and can lead to false positives. Using anomaly detection can be effective, for example, by detecting unusual emailing patterns such as large volumes of email or emailing unusual people. Without limitation, the following are some possible mitigation methods
 1. Invoke Compromised Account\Credential Loss mitigations (e.g., security continuity)
 2. Invoke Outbound\Internal Malware mitigations
 3. Outbound Spam scanning
 4. Enhanced URL checks Outbound Data Leak Without limitation, an outbound data leak can occur in a number of ways, such as, for example:
 1. Malicious insider
 2. Compromised account
 3. Targeted malware Some security systems, e.g., Mimecast Data Leak Prevention (DLP) and Targeted Threat Protection (TTP) Internal Email Protect (IEP) products, provide for detection of inbound, outbound, and internal data leak issues, but actions generally are limited to notification and remediation of the offending message(s). Without limitation, the following are some possible additional mitigation methods:
 1. Invoke Compromised Account\Credential Loss mitigations (e.g., security continuity)
 2. User access revoked to all but essential mail-flow pending investigation
 3. User has all messages pass through Admin or a designated user for review
 4. Invoke enforced Security Continuity (e.g., Mimecast for Outlook (MfO) or through email system rules) so that even internal messages are forced through the platform for additional checks Malicious URLs Some security systems, including some Mimecast security systems, perform malicious URL detection but generally focus on detection and blocking with some remediation generally aimed at removal of messages with malicious links. Without limitation, the following are some possible additional detection methods:
 1. Customer credential entry on phishing site
 2. Mimecast cloud credential entry on phishing site
 3. Third party credential entry on phishing site
 4. Malware download Without limitation, the following are some possible mitigation methods that could be taken depending on the nature of the malicious URL:
 1. Invoke Compromised Account\Credential Loss mitigations (e.g., security continuity)
 2. Invoke Ransomware & Encrypted files mitigations
 3. Invoke Outbound\Internal malware mitigations Ransomware and Encrypted Files A ransomware infection is usually triggered by a malware infection. The nature of ransomware makes its specific characteristics easy to detect. A ransomware infection has the goal of encrypting files in a document store, which can include:
 1. Local file servers
 2. Local Exchange or O365
 3. OneDrive
 4. Other cloud stores While it is possible that ransomware can run slowly in the background to avoid detection, it is most common for encryption to happen rapidly. Note that ransomware make take action to avoid end-user detection by encrypting a large number of old\seldom accessed files first.

Without limitation, the following are some possible detection methods:
 1. Unusual volumes of encrypted files (i.e. unreadable files) being detected
 2. File name, extension or mime-type changes (this may be seen as file removal and addition)
 3. Usage of unknown or random extensions
 4. Usage of common malware extensions
 5. File size changes
 6. Large volumes of file changes\removals
 7. Sudden changes to rarely changed files Without limitation, the following are some possible mitigation methods:

1. Enhanced Backup & Restore. More frequent backups for all users
2. Enhanced Backup & Restore. Disable backups or hide updates in Mimecast Apps for affected users
3. Enhanced Backup & Restore. Enable TTP AP style checks on new and updated files.

Anomalous Activity

Anomalous activity is any sort of activity outside some sort of "learned normal pattern." It is possible to look for anomalous activity in many of the products and communications that user interact with, such as, for example, without limitation:
1. Mail
2. DNS
3. Web
4. Identity
5. Files (e.g., local or cloud)
6. Folders The system can track anomalies in certain behaviors, such as, for example:
1. Volume of activity, e.g., Outbound\Internal\Inbound mail or DNS requests
2. Recipient types or counts e.g. new recipients or contacts, large numbers of recipients or large numbers of new recipients
3. Location and Device Proximity e.g. if a login is occurring from a location not corresponding with a user's device locations then it could be suspicious, can be network location or GEO location for other devices
4. Time of day
5. Types of Activity, e.g., Archive Searches, Outbound spam detection headers
6. Writing Style Among other things, outbound spam detection can include analyzing mail volume over time, e.g., at an account level. Without limitation, at an account (or grid) level, it is possible to detect the following anomalous activities that are relevant to security incidents:
1. Connections—SMTP, POP, API
2. Mail flow—accepted messages, rejected messages, spam, malware
3. URLs—malicious URLs, malicious clicks
4. Authentication—successful, failed, locked out
5. Files—new, updates or encrypted files
6. DNS requests Each of these could be used as an indicator of security incident or as a starting point to trigger additional more in-depth detections.

No specific mitigations exist for anomalous behavior as a whole, as the type of anomalous behavior dictates the mitigations and is covered in its own specific section.

Directory Monitoring

Without limitation, a number of security issues can be detected by malicious changes to Active Directory or other directory services, such as, for example:
1. Malicious insider, e.g., password changes, delegate changes, access right changes, etc.
2. Malware that attacks Active Directory (e.g., "skeleton key" malware)
3. Malware that re-configures Active Directory Note that such monitoring could extend beyond Active Directory stored configuration and into other systems including Office 365, G-Suite and the Mimecast customer configuration.

Some systems already synchronize elements of an organization Active Directory or other directory service into the grid. This is primarily aimed at obtaining a full list of users and groups so that mail flow operates properly, and policy can be configured against the customers Active Directory efficiently. By extending the scope of an Active Directory or other directory service to include more elements, then it would be possible to monitor for "suspicious changes" in the configuration or rules. Without limitation, the scope of such monitoring could include:
1. Any change to certain portions of a directory, e.g., those likely to low change
2. Additional mail flow rules such as BCC or message deletion
3. Addition of members to certain groups or DLs
4. Delegate access permissions
5. Modification of access rights to files, folders, directory structure, and so on Without limitation, such monitoring can be achieved in multiple ways, including:
1. Replication of data in the grid and manual change monitoring
2. Monitoring Active Directory audit logs, something that is recommended by Microsoft.

Without limitation, mitigation in the event a suspicious change it detected can include:
1. Administrator\users alerts
2. Disable Active Directory sync updates into the grid
3. Revert changes in Active Directory (needs investigation)
4. Disable access if malicious user detected Supply Chain Compromise Supply chain compromise is an area that a cloud infrastructure should be able to offer considerable benefit, as the same supply chain compromise may affect many organizations and the network benefits of having all those organizations on the same platform allows for a better solution. For purposes of this discussion, a supply chain compromise can be defined as inbound malware/phishing/spam from regular/known supply chain contact. Supply chain compromise is essentially the reverse of many other compromises discussed herein. The compromises described elsewhere generally are internal threats that either affect internal or external targets, whereas in this case, the supply chain compromise is an internal compromise from a trusted external. It is the trust relationship with the external that is the major risk here.

A common factor in supply chain compromise will be that the compromised external is likely to deal with a number of users and there is a chance they will be in the same or similar business vertical, which makes this sort of compromise detectable at low volume, e.g., using cross customer (and perhaps cross grid) detections. Note that while a supply chain is usually considered to be a third party, it is possible for it to be an internal "supplier." This could be common in larger organizations and is an emerging threat that is starting to get attention by security experts.

Without limitation, detection can include so-called "monitored domains" that provide for a custom list of domains with which a specific organization has a relationship. An alternative approach would be by monitoring an organization's contacts. By monitoring these domains/contacts for such things as spam, malware, malicious URLs, and impersonation, it is possible to indicate whether or not an external entity is compromised. As the same external entity is likely to be a supplier for many organizations, it is also possible to use the volume of such detections across all organizations even when those organizations do not explicitly monitor the domain. Also, a supplier suffering from a supply chain compromise also can be from a detectable outbound outbreak.

Without limitation, the following are some possible mitigation methods
1. Disable any Supplier or contact based whitelists or bypasses
2. Enable Supplier or contact blocks\holds
3. Inform "Supply Chain Manager" or contact owner
4. Re-check previous messages from supplier or contact from prior to breach In this type of incident, security incident reporting actions (discussed below) are of particular use due to the trusted nature of the supplier or contact that has been breached.

Threat Intelligence Systems

It should be noted that many of the security incident types and detections discussed herein are also relevant to threat intelligence systems, with one difference being that security continuity is more focused keeping a user or organization running while such an event is ongoing as well as providing detailed insight into it.

Dynamic User Logon Identity Credentials

In certain exemplary embodiments, the system is configured to change the user's primary logon identity credentials for each logon, specifically using the approach described above in which the system provides an additional piece of information (e.g., an OTP) for the user to combine with the user's primary logon identity information (e.g., person+XXXX@organization.com, as discussed above). Among other things, such dynamic user logon identity credentials should be easy for the user to implement because only the additional piece of information needs to be obtained to combine with the user's known primary identity credentials, while making it very difficult for an attacker to guess the logon identity credentials to carry out a breach or lockout attack. Also, such dynamic user logon identity credentials should make the transition to security continuity seamless because no new instructions would need to be provided to the user when security continuity is invoked. For example, when security continuity is invoked, the system may simply force the user to logon (e.g., by logging out an existing session), and this logon would be identical to any other logon, i.e., the user would receive a dynamically-generated additional piece of information and use that additional piece of information as part of the logon identity credentials. Since dynamic user logon identity credentials would be used for every logon, the user generally would not be able to distinguish between a "normal" logon and a logon due to security continuity. Thus, for example, the system could notify the user that security continuity has been invoked, either prior to the user attempting to logon (e.g., via text or email), at the time the user attempts to logon (e.g., on the logon screen), or after the user has successfully logged on. As discussed above, the additional piece of information can be combined with the original logon identity credential information in any manner, with or without a connector such as "+."

Alternate Logon Identity Credentials Substitute for 2FA

Some systems require 2FA to complete a logon. If the system determines that a user's account has been compromised even using the 2FA mechanism (i.e., the 2FA mechanism cannot be trusted), then security continuity can be invoked for the user such that alternate user logon identity credentials are provisioned for the user as discussed above.

Some systems allow the user to select between multiple 2FA mechanisms, e.g., the user may be able to choose an OTP mechanism, a text message sent to the user's phone, an email, etc. If the user's account has been compromised using one of the available 2FA mechanisms, then the system may allow the user to logon using one of the other available 2FA mechanisms that are not considered to be compromised. In this case, the system may be configured to invoke security continuity only when all available 2FA mechanisms are considered compromised such that alternate user logon identity credentials are provisioned for the user as discussed above.

Thus, for example, security continuity may be selectively invoked based on the availability of alternative authentication mechanisms.

Force Web Site to Prove Itself Before User Enters Password

One issue when a user logs onto a user account (even with 2FA) is that the user generally provides logon identity and password before the user has any proof that the logon system into which the credentials are being entered (e.g., web page) is authentic and can be trusted. In other words, the 2FA stage comes too late. For example, if the logon system is fraudulent, then the user's logon credentials will have been compromised before even reaching the 2FA stage, i.e., after the user enters logon identity and password and before any actual or expected 2FA challenge (e.g., via email or text). Generally speaking, the purpose of a 2FA challenge is to prove the user's authenticity to the system, not necessarily to prove the system's authenticity to the user. For example, particularly in situations where the user's email address is used as the logon identity, the fraudulent logon system could send a fake 2FA challenge to the user's email address (which the user provided as part of the logon process) including a code to be entered into the fraudulent system. A fake 2FA challenge would further the illusion of authenticity and trustworthiness of the system and therefore could make it more likely that the user would be willing to enter even more personal information such as social security number, bank and credit card information, etc. Thus, entering the password before any proof of authenticity of the web page certainly can be seen as a flaw in the process, and in some cases, even entering the logon identity before any proof of authenticity of the web page can be seen as a flaw.

It should be noted that this can be an issue not only for "normal" logons but also can be an issue for logging on during security continuity, e.g., if a fraudulent security continuity logon screen were to be presented to the user, the user could enter the temporary logon identity and password, thereby negating a main purpose of the security continuity system.

Therefore, in certain exemplary embodiments, the logon sequence is modified substantially as follows:
1. Untrusted website—user enters logon identity
2. Trusted website—send email to email address with a mechanism that proves the authenticity of the web page and includes a secure mechanism for the user to enter the password. For example, without limitation, the email could include a private logon link, a 2FA code, and/or something private that an attacker would not know (e.g., a picture, phrase, personal information, etc.)
3. Trusted website—enter password
4. (opt) Trusted website—send SMS\Mobile App (email authentication would be pointless since a potential attacker already would know the user's email address)
5. (opt) Trusted website—enter 2FA code Automatic Email Delegation In certain exemplary embodiments, the system can be configured to automatically direct some or all of a person's incoming emails to one or more designees for a security event such as when the person's account is suspended (e.g., from an actual or suspected attack or breach such as from multiple failed logon attempts using the primary user logon identity credentials associated with the account) or when security continuity is invoked. For example, when automatic email delegation is invoked, all incoming emails may be directed to the designee, or certain emails meeting specified criteria (e.g., all emails containing the word "emergency," or all emails from a specified sender) may be directed to the designee. Such automatic account delegation can be part of a larger security continuity system of the type described herein, for example, activating automatic account delegation as an interim step between the system locking the person's account or invoking security continuity and the person logging on using alternate user logon identity credentials provisioned by the system, after which the automatic account delegation could be terminated (since the person then would have access to and control over incoming emails). The system can provide a mechanism for the person to determine which incoming emails were directed to the designee, e.g., providing a separate email folder (e.g., a "Delegated Items" folder containing copies of the delegated emails, which also may be shown in the Inbox), highlighting the delegated emails in the Inbox, etc. Similarly, the system can provide a mechanism for the person to see what actions, if any, were taken by the designee (e.g., if the designee responded to an incoming email, and if so, a copy of the response and any related email exchanges can be provided).

Combinations

This patent application discloses a number of different concepts including, but not limited to, different types of security events, different ways of monitoring/detecting security event, different types of mitigation actions for such security events including security continuity using alternate user logon identity credentials, email delegation, web site proof of identity, dynamic user logon identity credentials, and alternate logon identity credentials as a substitute for two factor authentication. It should be noted that, generally speaking, the disclosed concepts can be implemented (and potentially patented) individually or in any combination whether or not combined concepts mutually support each other in their effects to such an extent that a new technical result is achieved. For but one example, any way of monitoring/detecting a particular security event can be used to trigger security continuity and/or other disclosed mitigation action, and any such combination can be used with or without email delegation, and any such combination with or without email delegation can be used with or without web site proof of identity, etc., etc. This paragraph should be considered a substitute for expressly disclosing each and every possible combination of concepts, which is a virtual impossibility and is certainly an impracticability, such that, at a minimum, every possible combination is constructively disclosed herein.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., continuity systems) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, some potential subject matter directed to automatic email delegation that may be claimed (prefaced with the letter "P" so as to avoid confusion with the actual claims presented below) includes:

P1. A method comprising:
  detecting a security event affecting a system (e.g., user email account, IM, SMS, Dropbox, etc.); and
  automatically directing some or all incoming emails for the user email account to a designee in response to detecting the security event.

P2. A method according to claim P1, wherein the security event is a user email account lockout.

P3. A method according to claim P1, wherein the security event includes invocation of a security continuity system.

P4. A method according to claim P1, wherein only incoming emails meeting specified criteria are directed to the designee.

P5. A method according to claim P4, wherein the specified criteria includes a specified word or phrase.

Without limitation, some potential subject matter directed to "grey area" that may be claimed (prefaced with the letter "P" so as to avoid confusion with the actual claims presented below) includes:

P1. A security mitigation method comprising:
monitoring an online system for evidence of a security event;
implementing a first set of security mitigation actions during a "grey" period when likelihood of the security event based on such monitoring is below a predetermined probability or confidence level; and implementing a second set of security mitigation actions when likelihood of a security event based on such monitoring is at or above the predetermined probability or confidence level.

P2. A method according to claim P1, wherein implementing a second set of security mitigation actions comprises:
activating a security continuity system to provide access to the online system using alternate user logon identity credentials provisioned by the security continuity system.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of managing access to user accounts for a security event, the user accounts accessed through primary user logon identity credentials, the method comprising:
receiving, by a security continuity system, a control signal invoking security continuity;
securing, by the security continuity system, the user accounts and the primary user logon identity credentials;
automatically provisioning, by the security continuity system, alternate user logon identity credentials, wherein the alternate user logon identity credentials are generated and distributed by the security continuity system after security continuity is invoked;
storing, by the security continuity system, the alternate user logon identity credentials in a credential data store;
providing, by the security continuity system, selective access to user account information through the alternate user logon identity credentials and blocking or restricting access to such user account information through the primary user logon identity credentials; and
automatically directing some or all of a user's incoming emails to a designee when the security continuity system is invoked until at least a user logon using the alternate user logon identity credentials.

2. A method according to claim 1, further comprising:
monitoring the user accounts; and
automatically generating the control signal upon detecting a security event involving at least one user account.

3. A method according to claim 1, wherein the control signal is derived from at least one of:
a user account lockout;
a user account compromise;
deviation from a baseline;
a user panic button mechanism; or
an administrator action.

4. A method according to claim 1, wherein the alternate user logon identity credentials include a logon identity that is obfuscated or modified with an additional piece of information.

5. A method according to claim 4, wherein the additional piece of information includes one of:
a one-time password provided to the user by the security continuity system; or
a user personal identification number.

6. A method according to claim 1, wherein the alternate user logon identity credentials include a logon identity that is not used outside of the security continuity system.

7. A method according to claim 1, wherein the security continuity system allows for selective use of both the primary user logon identity credentials and the alternate user logon identity credentials based on user location or other predetermined factors.

8. A method according to claim 1, wherein providing selective access to user account information through the alternate user logon identity credentials includes at least one of:
selectively allowing access to a predetermined class of information;
selectively blocking access to a predetermined class of information;
selectively allowing a predetermined class of operations;
selectively blocking a predetermined class of operations;
sending outgoing emails using an alternate email address associated with the alternate user logon identity credentials; or
sending outgoing emails using an original user email address, such that the use of the alternate user logon identity credentials is hidden from other email users.

9. A method according to claim 1, further comprising:
disabling security continuity; and
restoring user access to the user accounts via one of:
new permanent user logon identity credentials provisioned by the security continuity system while security continuity was active;
conversion of the alternate user logon identity credentials to new permanent user logon identity credentials by the security continuity system; or
reactivation of the primary user logon identity credentials by the security continuity system.

10. A method according to claim 1, further comprising:
monitoring user account activity;
implementing a first set of security mitigation actions during a "grey" period when likelihood of a security event based on such monitoring is below a predetermined probability or confidence level; and
implementing a second set of security mitigation actions including generating the control signal invoking security continuity when likelihood of a security event based on such monitoring is at or above the predetermined probability or confidence level.

11. A security continuity system for managing access to user accounts for a security event, the user accounts accessed through primary user logon identity credentials prior to the security event, the system comprising:
 a credential data store; and
 a security continuity controller comprising a processor coupled to a non-transitory memory containing instructions executable by the processor to perform computer processes comprising:
 receiving a control signal invoking security continuity;
 securing the user accounts and the primary user logon identity credentials;
 automatically provisioning alternate user logon identity credentials, wherein the alternate user logon identity credentials are generated and distributed by the security continuity system after security continuity is invoked;
 storing the alternate user logon identity credentials in a credential data store;
 providing selective access to user account information through the alternate user logon identity credentials and blocking or restricting access to such user account information through the primary user logon identity credentials; and
 automatically directing some or all of a user's incoming emails to a designee when the security continuity system is invoked until at least a user logon using the alternate user logon identity credentials.

12. A system according to claim 11, wherein the processes further comprise:
 monitoring the user accounts; and
 automatically generating the control signal upon detecting a security event involving at least one user account.

13. A system according to claim 11, wherein the control signal is derived from at least one of:
 a user account lockout;
 a user account compromise;
 deviation from a baseline;
 a user panic button mechanism; or
 an administrator action.

14. A system according to claim 11, wherein the alternate user logon identity credentials include a logon identity that is obfuscated or modified with an additional piece of information.

15. A system according to claim 14, wherein the additional piece of information includes one of:
 a one-time password provided to the user by the security continuity system; or
 a user personal identification number.

16. A system according to claim 11, wherein the alternate user logon identity credentials include a logon identity that is not used outside of the security continuity system.

17. A system according to claim 11, wherein the security continuity system allows for selective use of both the primary user logon identity credentials and the alternate user logon identity credentials based on user location or other predetermined factors.

18. A system according to claim 11, wherein providing selective access to user account information through the alternate user logon identity credentials includes at least one of:
 selectively allowing access to a predetermined class of information;
 selectively blocking access to a predetermined class of information;
 selectively allowing a predetermined class of operations;
 selectively blocking a predetermined class of operations;
 sending outgoing emails using an alternate email address associated with the alternate user logon identity credentials; or
 sending outgoing emails using an original user email address, such that the use of the alternate user logon identity credentials is hidden from other email users.

19. A system according to claim 11, wherein the processes further comprise:
 disabling security continuity; and
 restoring user access to the user accounts via one of:
  new permanent user logon identity credentials provisioned by the security continuity system while security continuity was active;
  conversion of the alternate user logon identity credentials to new permanent user logon identity credentials by the security continuity system; or
  reactivation of the primary user logon identity credentials by the security continuity system.

20. A system according to claim 11, wherein the processes further comprise:
 monitoring user account activity;
 implementing a first set of security mitigation actions during a "grey" period when likelihood of a security event based on such monitoring is below a predetermined probability or confidence level; and
 implementing a second set of security mitigation actions including generating the control signal invoking security continuity when likelihood of a security event based on such monitoring is at or above the predetermined probability or confidence level.

21. A computer program product for managing access to user accounts during a security event, the user accounts accessed through primary user logon identity credentials prior to the security event, the computer program product comprising a tangible non-transitory computer readable medium having stored therein computer program instructions which, when executed by at least one processor, perform computer processes comprising:
 receiving a control signal invoking security continuity;
 securing the user accounts and the primary user logon identity credentials;
 automatically provisioning alternate user logon identity credentials, wherein the alternate user logon identity credentials are generated and distributed by the security continuity system after security continuity is invoked;
 storing the alternate user logon identity credentials in a credential data store;
 providing selective access to user account information through the alternate user logon identity credentials and blocking or restricting access to such user account information through the primary user logon identity credentials; and
 automatically directing some or all of a user's incoming emails to a designee when the security continuity system is invoked until at least a user logon using the alternate user logon identity credentials.

* * * * *